C. LAMPERT.
METHOD OF COOKING ARTICLES OF FOOD.
APPLICATION FILED MAR. 31, 1909.

1,024,637.

Patented Apr. 30, 1912.

Witnesses
F. Stern
J. Spantikow

Inventor
Carl Lampert
by B. Singer
Attorney

UNITED STATES PATENT OFFICE.

CARL LAMPERT, OF FRANKFORT-ON-THE-MAIN, GERMANY.

METHOD OF COOKING ARTICLES OF FOOD.

1,024,637.  Specification of Letters Patent.  Patented Apr. 30, 1912.

Application filed March 31, 1909. Serial No. 486,847.

*To all whom it may concern:*

Be it known that I, CARL LAMPERT, a subject of the Emperor of Germany, and residing at Frankfort-on-the-Main, Germany, have invented a certain new and useful Improvement in Methods of Cooking Articles of Food, of which the following is a specification.

The present invention relates to an improved process for cooking meat, fish, poultry and the like.

The essential operation of the process consists in placing the article to be cooked, without any additions of fat or water, into a grease- and water-tight bag of poor heat conducting material, closing the bag and sealing the same with some adhesive substance having no injurious effect upon the food, for example, with flour mixed in water, and then subjecting the bag to indirect heating. For this purpose the bag with its contents is placed into an air-tight receptacle adapted to withstand great heat and of such dimensions that the bag does not contact with the walls of said receptacle. Preferably, the bag is placed on a grid within the receptacle and above the bottom thereof. The article of food; meat, fish, poultry, or the like, treated in such manner, although cooked solely with its own fat and water contents, without any addition of fat and water, is particularly juicy and tender, retaining its specific flavor, albumin-contents etc.

The bag used in the performance of the process must be grease- and water-tight, not affected by heat, and such that it will not impair the flavor of the food. The bag may suitably be made of some fibrous material which is already grease- and water-tight, or is so rendered subsequently.

Parchment paper cannot be penetrated by grease or water, but the heat may exert the proper influence therethrough upon the article to be prepared. Any adhesive substance which neither in cold, heated, dry nor moist condition impairs the flavor of the food, may be used, such as for example flour mixed in water, or the like.

Suitable apparatus for performing the described process is illustrated by way of example in the accompanying drawing in which—

Figure 1:
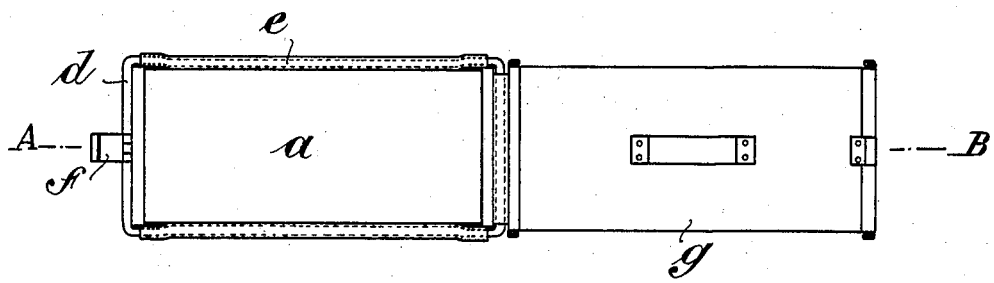
Figure 2:
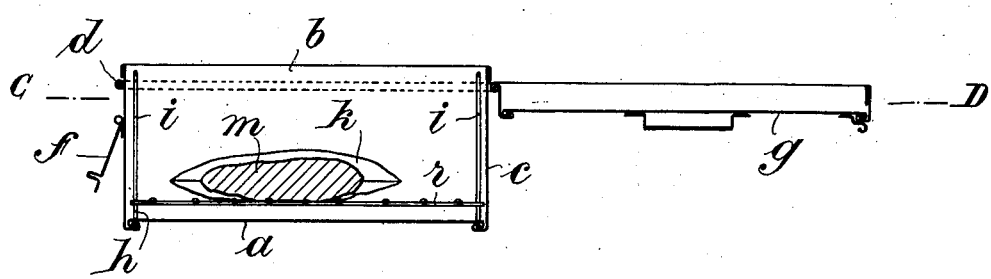
Figure 3:
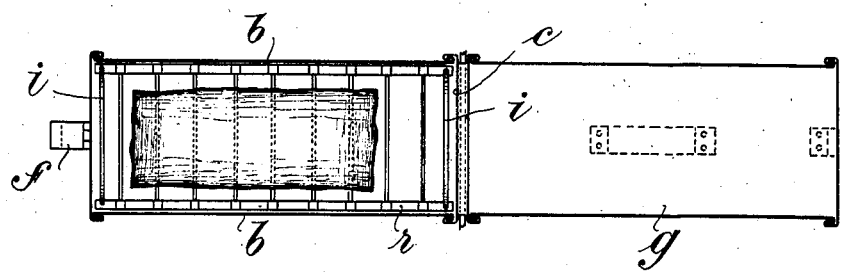

Figure 1 is an inverted plan. Fig. 2 a section of Fig. 1 on the line B—A. Fig. 3 is a plan of the apparatus.

The apparatus comprises a receptacle, the bottom $a$ and side walls $b$ of which are made in one piece, and jointed with the cross walls $c$ solely by folded seams as shown in Fig. 3. The receptacle may be suitably strengthened by a strap $d$ held by an overturned part $e$ of the walls $b$. To one side of this strap may be attached a catch $f$, while a cover $g$, made similar to the under portion, is hinged to the other side of the strap, the latter serving as an abutment for the cover, when in closed position.

A receptacle of such construction may be subjected to great heat without impairing its air-tightness. Inside said receptacle is placed a grid $r$ provided with feet $h$ and handles $i$ made without soldered joints. The article of food $m$ is contained within the bag $k$ the inlet opening of which is tightly closed and sealed up with an adhesive substance. The grid $r$ must be of such dimensions that the bag $k$ does not contact with any of the walls of the receptacle so as to prevent burning of the food. The inclosing of the food article into the flexible bag presents the further advantage that at any time on opening the cover the stage of the cooking may be easily ascertained by, pressing the article with a fork or pin, but preferably with a blunt instrument.

Having now described my invention what I claim and desire to secure by Letters Patent of the United States is:—

The method of cooking articles of food, which consists in inclosing the articles in a paper bag which is grease and water tight, closing the bag and subjecting the same to heated air in an airtight receptacle, while the bag is free of contact with the sides or walls of the receptacle.

In testimony whereof I have signed my name to this specification in the presence of two subscribing witnesses.

CARL LAMPERT.

Witnesses:
BERNHARD KAISER,
JEAN GRUND.